United States Patent [19]

Good

[11] Patent Number: 4,815,544

[45] Date of Patent: Mar. 28, 1989

[54] CULTIVATOR DISC ADJUSTER

[75] Inventor: Garry R. Good, Kewanee, Ill.

[73] Assignee: Allied Products Corporation, Chicago, Ill.

[21] Appl. No.: 17,749

[22] Filed: Feb. 24, 1987

[51] Int. Cl.⁴ .................. A01B 21/08; A01B 71/02
[52] U.S. Cl. ................................ 172/430; 172/603; 172/574
[58] Field of Search ............ 172/603, 602, 600, 742, 172/430, 574, 742, 744

[56] References Cited

U.S. PATENT DOCUMENTS

| | | | |
|---|---|---|---|
| 542,483 | 7/1895 | Linthicum | 172/603 X |
| 658,253 | 9/1900 | Foster | 172/603 X |
| 1,028,053 | 5/1912 | Mikesell | 172/742 X |
| 1,094,068 | 4/1914 | Haas | 172/603 |
| 2,973,819 | 3/1961 | Simmons | 172/603 X |
| 3,351,139 | 11/1967 | Schmitz | 172/602 |
| 4,607,705 | 8/1986 | Tebben | 172/603 X |
| 4,650,005 | 3/1987 | Tebben | 172/603 |
| 4,738,316 | 4/1988 | Wood | 172/603 |

*Primary Examiner*—Richard J. Johnson
*Attorney, Agent, or Firm*—Haverstock, Garrett and Roberts

[57] ABSTRACT

This invention provides a double adjustable weeding disk support device in order to make rapid and positive adjustments of the depth and cut of the weeding disks. This invention is characterized by a shaft having conventional weeding disks rotatably mounted on the lower end and a series of openings near the other end. The shaft projects upward through openings in the frame crossbar of a conventional cultivator, through an opening in a plate mounted in rigid relationship with the frame crossbar and through the collar mounted on an adjustment arm with the shaft being fixed by means of bolt through opposite openings in the collar and through an opening in the shaft. The adjustable arm can be held in fixed relationship with the fixed plate by inserting a bolt through mating openings in the adjustment arm and in the plate.

10 Claims, 4 Drawing Sheets

CULTIVATOR DISC ADJUSTER

BACKGROUND OF THE INVENTION

The present invention relates in general to farm implements and more particularly to cultivators wherein the depth and angle of cultivators such as weeding disks must be set to accomodate different types of soils and working conditions. Repeated adjustments of the depth and angle of the weeding disks is quite time consuming and it is desirable to reduce the time required to adjust the weeding disks to the desired position. Also, since the weeding disks associated with a cultivator generally are positioned to the same depth and angle, it is desirable to provide a means which permits simple duplication of the depth and angle of all the weeding disks associated with the cultivator.

U.S. Pat. No. 4,607,705 by John A. Tebben discloses a device wherein a weeding disk assembly is rotatably attached to the end of a vertical shaft and the vertical shaft is held in place on a crossbar by means of upper and lower u-bolts which project through holes in a plate across the end of the supporting crossbar and which are held in tight engagement by nuts tightened onto the threaded ends of the u-bolts. An upper end of the vertical shaft has attached thereto an angular gauge plate with markings thereon which project circumferentially against an upwardly projecting angle iron which contains numbers so that up and down and rotary adjustments can be noted and repeated.

The Tebben device is not well suited for the present heavy equipment used in routine farming operations because the plate and u-bolts device does not sufficiently rigidfy the structure against distortions encountered in routine operations of the equipment. When using the Tebben device, the user must be relatively close to the angular gauge in order to determine the angle and depth of the disk. Also, when using the Tebben device, when the u-bolts are loosened to make an angle adjustment there is no means of independently maintaining the vertical position of the disk. Great care must be taken to hold the disk at constant depth while changing the angular setting. The weight of the disk tends to make the disk want to slide down and cause the adjustment to be difficult. The present invention overcomes these deficiencies by providing a rapid double adjustable system for quickly and positively changing the depth of the disks and the angle of the cut and means to quickly ascertain the depth and angle of the weeding disk.

SUMMARY OF THE INVENTION

This invention includes a weeding disk cultivator adapted to be drawn by a tractor or similar vehicle which includes a frame structure and linkage means adapted to receive various attachments. The improvement comprises an adjustable disk support means linked to the frame structure. The adjustable disk support means includes at least one disk mounted on one end of a shaft in rotatable relation therewith. The shaft is linked to the frame structure in a generally vertical relationship when the weeding disk cultivator is in operating position. The shaft is mounted on the frame structure by means of a mounting bracket having an opening through which the shaft is passed in a generally tight fitting but moveable relationship. The shaft has a series of openings therethrough. The mounting bracket has a plate member securely engaged thereto in generally perpendicular relationship thereto and having a series of openings therein.

An adjustment arm has an opening near one end with an annular collar rigidly attached thereto. The annular collar is adapted to allow the shaft to pass through in close-fitting but moveable relationship and has opposite openings adapted for mating with the openings in the shaft and adapted to be held in rigid relationship with the shaft by inserting a holding means such as a bolt through the mated openings. The shaft is moveable up and down in the annular collar in order to provide upward and downward adjustment of the weeding disk in relation to the frame structure.

The adjustment arm extends in generally perpendicular relationship with the shaft and in slideable relationship with the plate member and has openings therein adapted to mate with openings in the plate member. Means such as a bolt is provided for connecting the adjustment arm with the plate member through the openings so that the cut of the disk can be adjusted by removing the connecting means and rotating the adjustment arm in relation to the plate member and reconnecting the adjustment arm to the plate member by the connecting means. In this manner, the depth of the disk assembly can be quickly and easily adjusted by removing the bolt and aligning a desired hole in the vertical shaft with the holes in the collar and then re-engaging the bolt. The angle of the disk assembly relative to the frame crossbar can be easily adjusted by removing the bolt connecting the plate and the adjustment arm and positioning the adjustment arm to the desired angle and reconnecting the plate and the adjustment arm. Also, if the plate member is securely engaged to the frame crossbar at a right angle relative to the frame crossbar, and if the vertical plane passing through the holes of the vertical shaft is parallel to the vertical plane on which the disk is located, the angles formed by the adjustment arm and disk relative to the frame crossbar will be the same. Thus, a user can determine the angle of the disk by merely looking at the angle of the adjustment arm relative to the frame crossbar.

Once the disk assembly is adjusted to the desired depth and angle, the vertical shaft may be held more rigidly in place by u-bolts engaged to a vertical plate which abuts the end of the frame crossbar and is secured in perpendicular relationship thereto. The vertical plate has holes therethrough which are adapted to receive the ends of u-bolts. The u-bolts are placed in position above and below the mounting bracket and are rigidly engaged by tightening nuts onto the threaded ends of the u-bolts. The u-bolts may be eliminated in some constructions if the frame through which the vertical shaft passes is strengthened, for example by using a bushing.

It is an object of this invention to provide rapid, positive, independent adjustment of the depth and angle of a conventional disk assembly.

It is another object of this invention to provide adjustment information which can be stored for repetitive use of equipment without experimentation.

These and other objects and advantages of the present invention will become apparent to those skilled in the art after considering the following detailed specification which discloses several representative embodiments of the present weeding disk adjustor in conjunction with the accompanying drawings, wherein:

DETAILED DESCRIPTION OF THE INVENTION

Following is a detailed description of the invention wherein like numbers are used to show like parts in the several figures.

Figure 1:
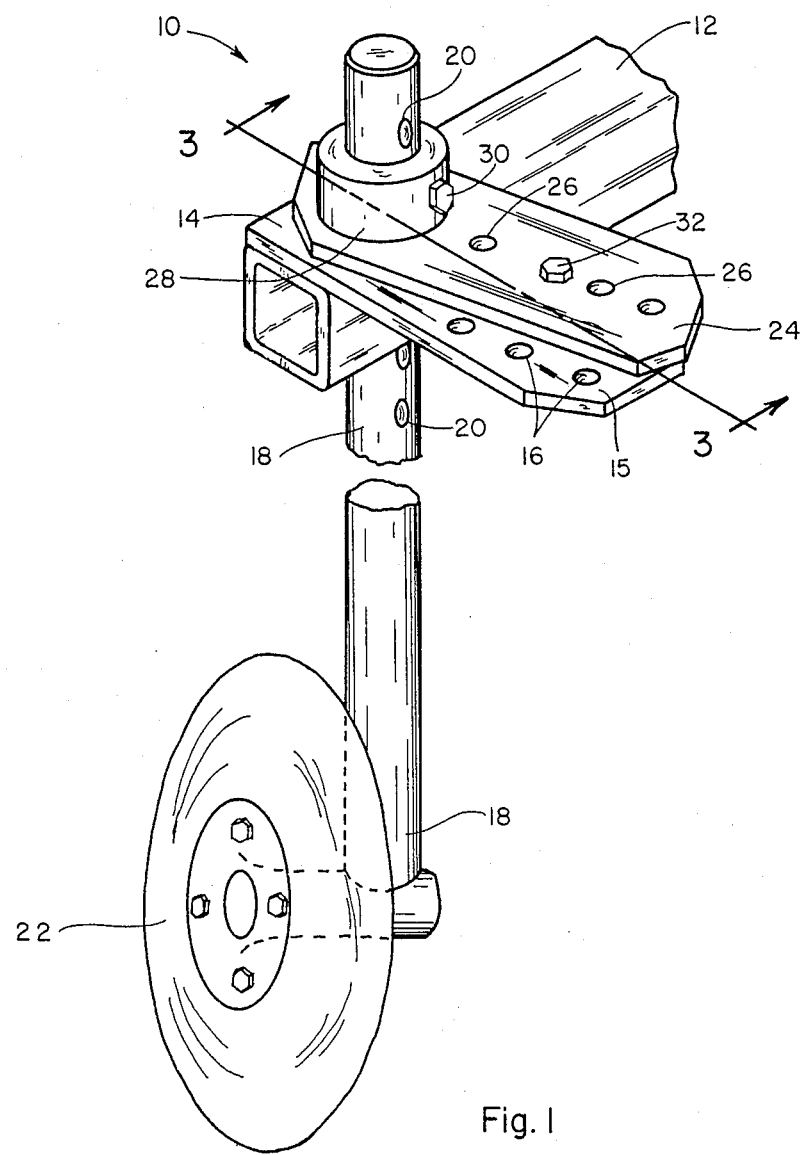
FIG. 1 is a perspective view of the earth working tool adjustment device with a conventional weeding disk engaged thereto.

With reference to FIG. 1, the double adjustable disk support device 10 includes a conventional frame crossbar 12 which is preferably in the form of a tube having a substantially rectangular or square cross section area. The frame crossbar 12 is shown in FIG. 1 as being hollow. However, the present device could also include a solid frame crossbar.

Figure 2:
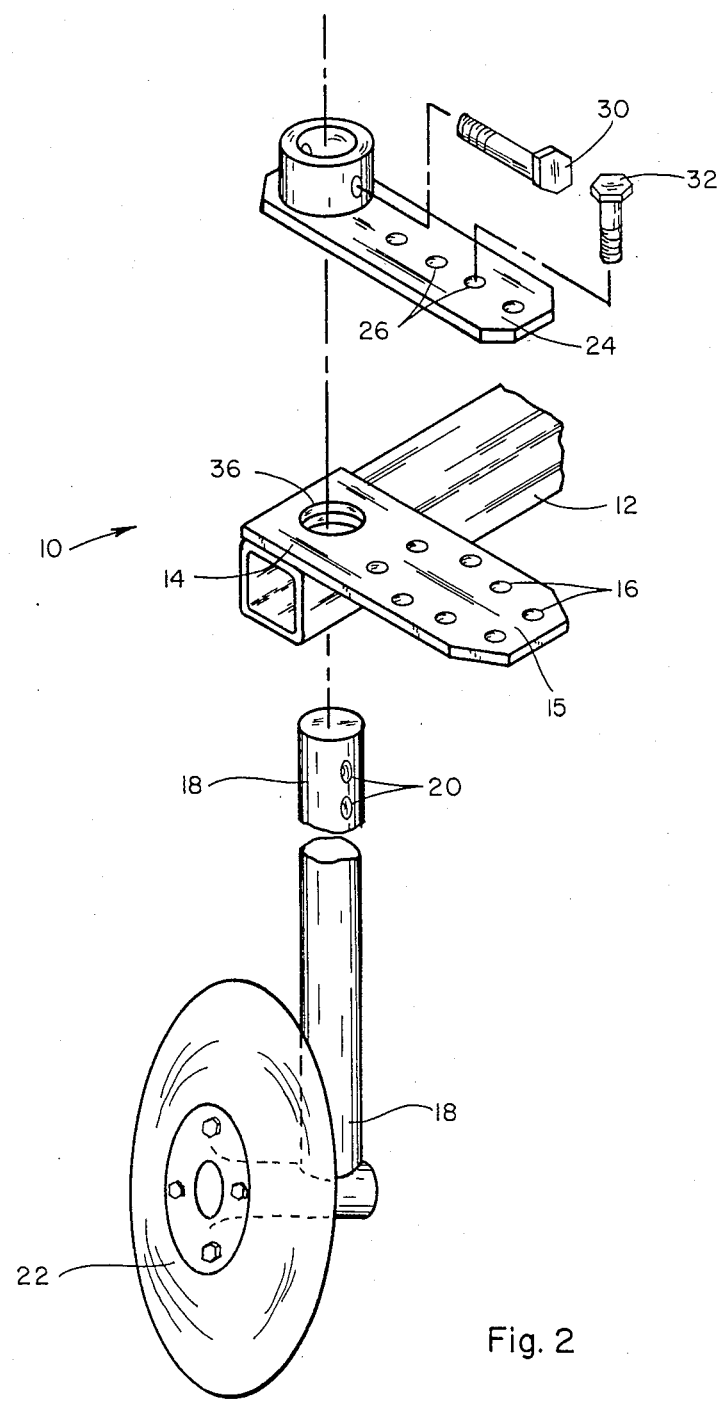
FIG. 2 is an exploded view of the earth working tool adjustment device with a convention weeding disk engaged thereto.

A mounting bracket H including a plate 15 having openings 16 therein is rigidly mounted on the frame crossbar 12 by conventional means such as welding. As best shown in FIG. 2, the plate 15 will preferably have a series of staggered holes or openings 16 in order to more easily complete the rotary adjustment. A shaft 18 projects upward through an opening in the frame crossbar and the plate member and in the preferred embodiment the shaft 18 has a series of vertically aligned holes 20 therein. The shaft 18 projects downward and a conventional disk 22 is mounted in a rotary conventional relationship therewith.

An adjustment arm 24 having a series of holes 26 therethrough which are suited to mate with holes 16 in the plate. The adjustment arm 24 has a collar 28 fixedly attached thereto with an opening adapted to allow the shaft 18 to project therethrough in tight but moveable relationship therewith. The collar 28 has oppossed aligned openings whereby bolt 30 can be inserted through the openings in the collar and through one of the holes 20 in the shaft 18 in order to make a rapid upward or downward adjustment of the working disk in relationship to the supporting frame structure. The collar 28 may be surface welded onto the adjustment arm 24 or it may be preferably inserted through the opening formed by the adjustment arm and welded in place to provide added strength.

The frame support structure is generally attached to the tractor three-point hitch and can be adjusted upward or downward by actuating a hydraulic system from the tractor seat. The frame crossbar 12 can be raised or lowered in this manner to release pressure on the shaft 18 thereby providing easier raising and lowering of the shaft 18 in the opening in the frame crossbar 12. Also, the invention may be used on cultivators wherein the frame support structure is supported by a pair of support wheels.

The collar 28 and adjustment arm 24 can be held in rigid relation with the shaft 18 by inserting bolt 30 through the opposite openings in the collar and one of the openings 20 in the shaft.

The cut of the disks can be quickly changed by rotating the adjustment arm 24 clockwise or counter clockwise and inserting bolt 32 through mating openings in the adjustment arm and in the plate. As with the upward and downward adjustment, the rotary adjustment can be best completed while the weight of the frame is supported by the tractor three-point hitch or a pair of support wheels. A significant feature of the invention is that either angle or depth adjustment can be made independently of the other. When removing bolt 32 to alter the angular setting the vertical setting is held constant by bolt 30. Likewise when bolt 30 is removed to adjust the depth the angle setting of the adjustment arm 24 is maintained by bolt 32.

Also, as shown in FIG. 1, the plate 15 is securely engaged to the frame crossbar 12 by the mounting bracket 14, and the plate 15 is at a right angle relative to the frame crossbar 12, and the vertical plane passing through the holes 20 in the shaft 18 is parallel to the vertical plane on which the disk 22 is located. It can be seen therefore that the angles formed by the adjustment arm 24 and disk 22 relative to the frame crossbar 12 are the same. Thus, a user can determine the angle of the disk 22 by merely looking at the angle of the adjustment arm 24 relative to the frame crossbar 12.

Referring to FIG. 2, the double adjustable disk support device 10 is shown with the parts exploded apart to more clearly show how they all fit together. The frame crossbar 12 is shown with the mounting bracket 14 welded thereto. Adjustment arm 24 is shown with collar 28 attached thereto. Bolt 30 for attaching the collar to the shaft and bolt 32 for attaching the adjustment arm to the plate are shown removed from the structure. When using the invention on heavy equipment subjected to severe use, it may be desirable to include a bushing 34 which will be inserted about the shaft 18 in the opening 36 in the mounting bracket 14 and the frame-crossbar 12. The bushing 34 can be made from especially hard metals and may include a grease fitting to facilitate movement of the shaft 18 within the bushing 34.

Figure 3:
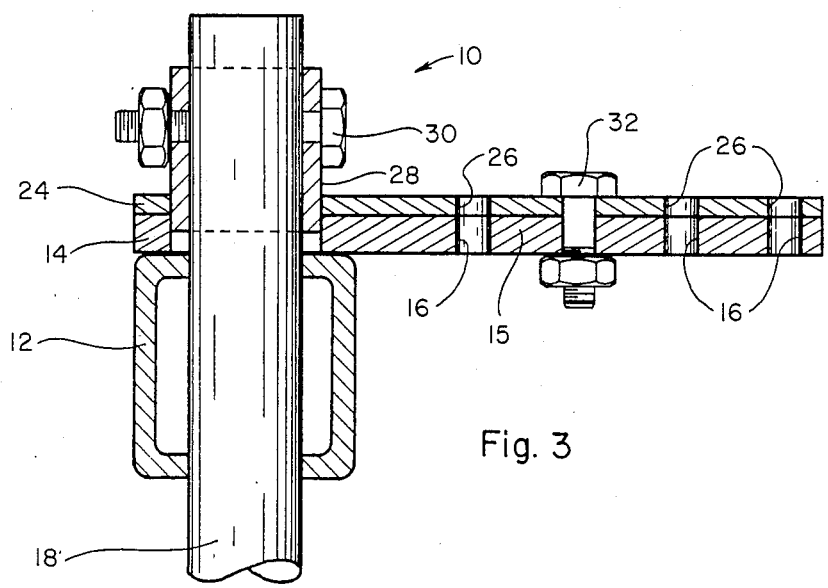
FIG. 3 is a side elevation of the earth working tool adjustment device taken along the lines 3—3 of FIG. 1.

FIG. 3 is a plan view of the double adjustable disk support device 10 taken along the lines 3—3 of FIG. 1. The end section of frame crossbar 12 is shown with the shaft 18 projecting upward therethrough. A plate 15 and the adjustment arm 24 are shown held in rigid relationship by bolt 32 and the collar 28 is shown held in rigid relationship with shaft 18 by bolt 30.

Figure 4:
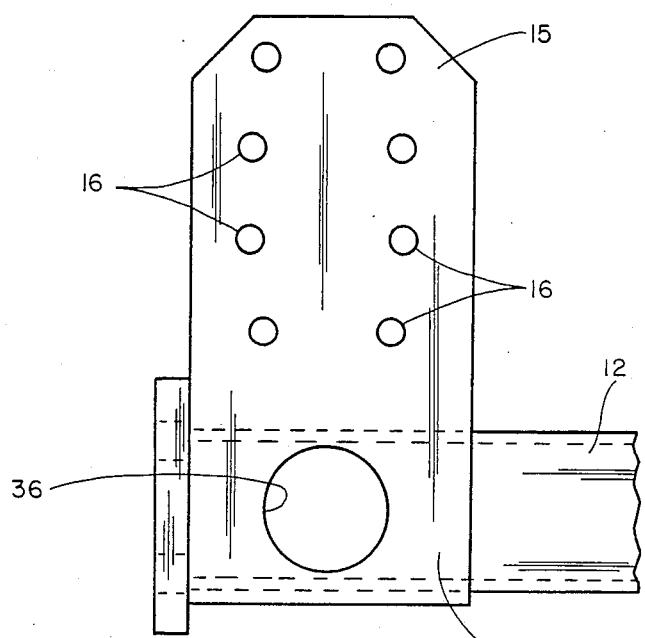
FIG. 4 is an upper plan view of the plate.

FIG. 4 shows an upper plan, view of the frame crossbar 12 with the mounting bracket 14 attached thereto. The holes 16 in the plate 15 are best shown in this figure in staggered relationship in order to mate with the openings in the adjustment arm.

Figure 5:
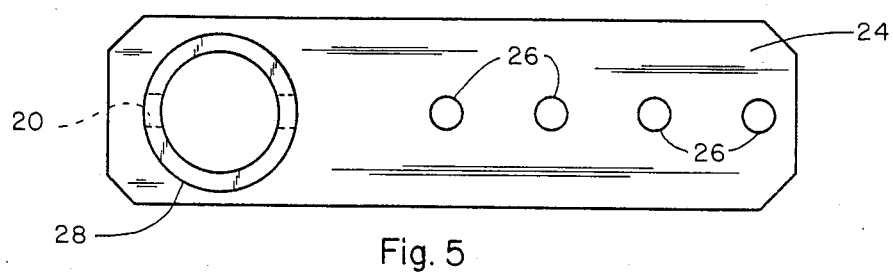
FIG. 5 is an upper plan view of the adjustment arm.

FIG. 5 is an upper plan view with adjustment arm 24 showing the holes 26 adapted to mate with the holes 16 in the plate when in operation on the double adjustable disk support device of this invention.

Figure 6:
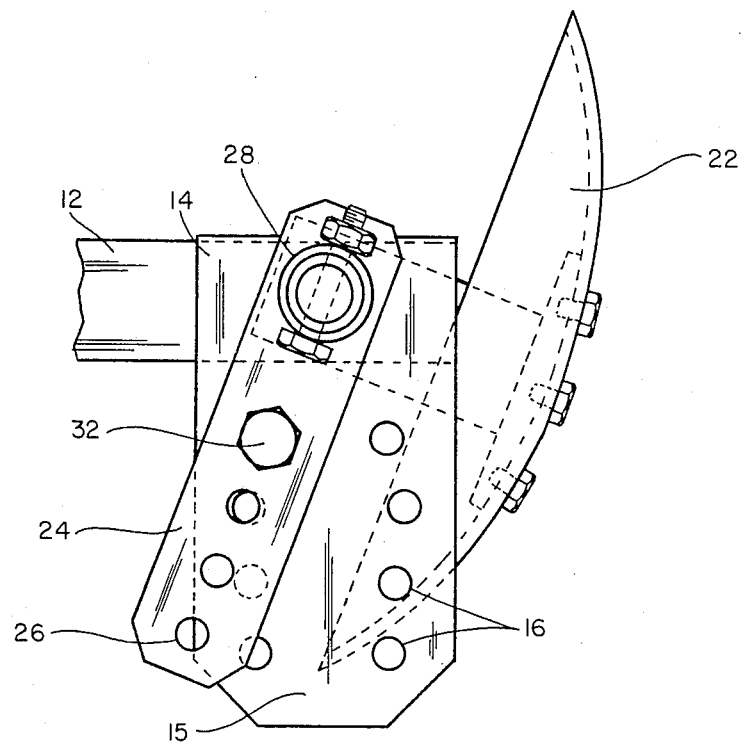
FIG. 6 is an upper plan view of the plate and adjustment arm showing a disk in place; and, FIG. 7 is a perspective view of an alternative embodiment of the earth working tool adjustment device showing inclusion of a plate and u-bolts.

FIG. 6 is an upper plan view showing the frame crossbar 12 with the mounting bracket 14 attached thereto and the adjustment arm 24 in moveable relation with the plate 15. FIG. 6 also shows in outline the position of the disk 22 when held in place by the apparatus of this invention.

Figure 7:
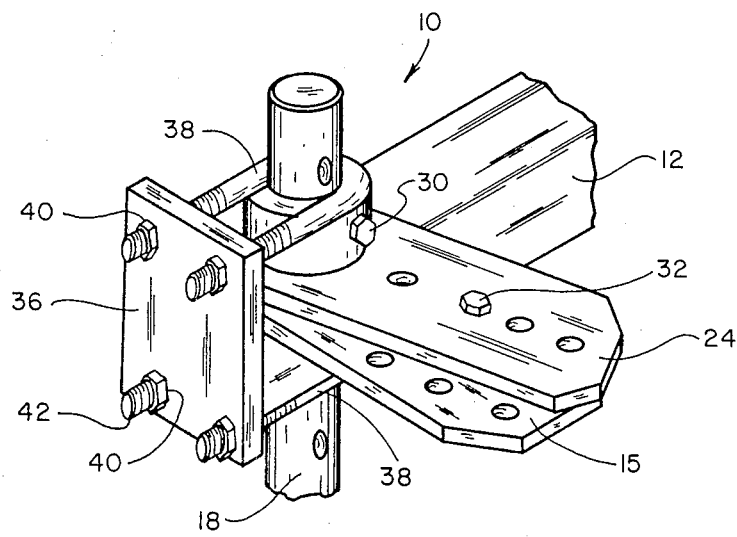

FIG. 7 is an alternative construction of the double adjustable disk support device 10 showing the frame crossbar 12 with the mounting bracket 14 attached thereto and the adjustment arm 24 mounted thereon in rotable relationship with plate 15 and showing the collar 28 held in place on the shaft 18 by means of bolt 30. FIG. 7 further shows a preferred embodiment of this invention wherein vertical plate 36 abuts the end of frame crossbar 12 with openings through which the ends of u-bolts 38 project about the shaft 18 and through the openings in the vertical plate 36 where they are tightened by nuts 40 on threaded ends 42 in order to further rigidify the shaft 18 and the frame crossbar 12.

Thus, there has been shown and described a novel weeding disk adjustor for use in conjunction with conventional tractors and other similar towing vehicles for performing a wide variety of varying weeding operations, which weeding disk adjustor construction fulfills all of the objects and advantages sought therefor. Many changes, modifications, variations and other uses and applications of the present weeding disk adjustor construction will, however, become apparent to those skilled in the art after considering this specification and the accompanying drawings. All such changes, modifications, variations, and other uses and applications which do not depart from the spirit and scope of the invention are deemed to be covered by the invention, which is limited only by the claims which follow.

Although this invention has been described in connection with a weeding disk cultivator it is adapted for use on any cultivator, e.g. a cultivator having shovels instead of disks.

I claim:

1. A weeding disk cultivator adapted to be drawn by a tractor or similar vehicle which includes a frame structure and linkage means adapted to receive various attachments such as gauge wheels, the improvement comprising:
   an adjustable disk support means coupled to said frame structure,
   said adjustable disk support means comprising at least one disk mounted on one end of a shaft in rotatable relation therewith,
   said shaft being coupled to said frame structure in a generally vertical relationship thereto when said weeding disk cultivator is in operating position,
   said shaft being mounted on said frame structure by means of a mounting bracket having an opening therethrough through which said shaft is passed in a generally tight fitting but moveable relationship,
   said haft having a series of openings therethrough,
   said mounting bracket having a plate member securely engaged thereto in generally perpendicular relationship thereto and having a series of openings therein,
   an adjustment arm having an opening near one end thereof with an annular collar rigidly attached thereto;
   said annular collar being adapted to fit over said shaft in close-fitting but moveable relationship and having opposite openings therethrough adapted for mating with the openings in said shaft and adapted to be held in rigid relationship with said shaft by inserting a holding means through the mated openings, said annular collar being moveable up and down on said shaft in order to provide upward and downward adjustment of said weeding disk in relation to said frame structure,
   said adjustment arm extending in generally perpendicular relationship with said shaft and in slideable relationship with said plate member and having openings therein adapted to mate with openings in said plate member,
   means for connecting said adjustment arm with said plate member through said openings so that the cut of said disk can be adjusted by removing the connecting means and rotating said adjustment arm in relation to said plate member and reconnecting the adjustment arm to said plate member by said connecting means.

2. The invention according to claim 1 wherein said shaft is cylindrical.

3. The invention according to claim 1 wherein said mounting bracket contains a bushing through which said shaft is passed.

4. The invention according to claim 1 wherein said plate member is an integral part of said frame structure.

5. The invention according to claim 4 wherein said plate member has a double row of staggered openings.

6. The invention according to claim 1 wherein said plate member has indicia thereon whereby the openings therein, can be mated with corresponding numbered openings in said adjustment arm in order to quickly and positively make repetitive changes in the disk cut.

7. The invention according to claim 1 wherein the openings in said shaft are numbered in order to quickly and positively make repetitive changes in the depth of the disk cut.

8. The invention according to claim 1 wherein the openings in said shaft are vertically aligned.

9. The invention of claim 1 whereby said shaft is held rigidly in position in said mounting bracket by means of a support structure having a plate with holes therein mounted in abutting relationship with said mounting bracket and with u-bolts surrounding said shaft and projecting through openings in said plate and held tightly in place by means of nuts tightened onto the threaded ends of said u-bolts.

10. A weeding disk cultivator adapted to be drawn by a tractor or similar vehicle which includes a frame structure and linkage means adapted to receive various attachments such as gauge wheels, the improvement comprising:
   a double adjustable disk support means coupled to said frame structure, said double adjustable disk support comprising at least one disk mounted on one end of a shaft in rotatable relation therewith, said shaft being coupled to said frame structure in a generally vertical relationship thereto when said weeding disk cultivator is in operating position, said shaft being mounted on said frame structure by means of a mounting bracket having an opening therethrough through which said shaft is passed in a generally tight fitting but moveable relationship, said shaft having a series of openings therethrough, said mounting bracket having a plate member securely engaged thereto in generally perpendicular relationship thereto and having a series of openings therein, an adjustment arm having an opening near one end thereof with an annular collar rigidly attached thereto, said annular collar being adapted to fit over said shaft in close-fitting but moveable relationship and having opposite openings therethrough adapted for mating with the openings in said shaft and adapted to be held in rigid relationship with said shaft by inserting a holding means through the mated openings, said annular collar being moveable up and down on said shaft in order to provide upward and downward adjustment of said weeding disk in relation to said frame structure, said adjustment arm extending in generally perpendicular relationship with said shaft and in slideable relationship with said plate member and having openings therein adapted to mate with openings in said plate member, means for connecting said adjustment arm with said plate member through said openings so that the cut of said disk can be adjusted by removing the connecting means and rotating said adjustment arm in relation to said plate member and reconnecting the adjustment arm to said plate member by said connecting means.

* * * * *